R. HOE.
INKING MECHANISM.
APPLICATION FILED DEC. 16, 1914.
1,214,787.
Patented Feb. 6, 1917.
6 SHEETS—SHEET 1.
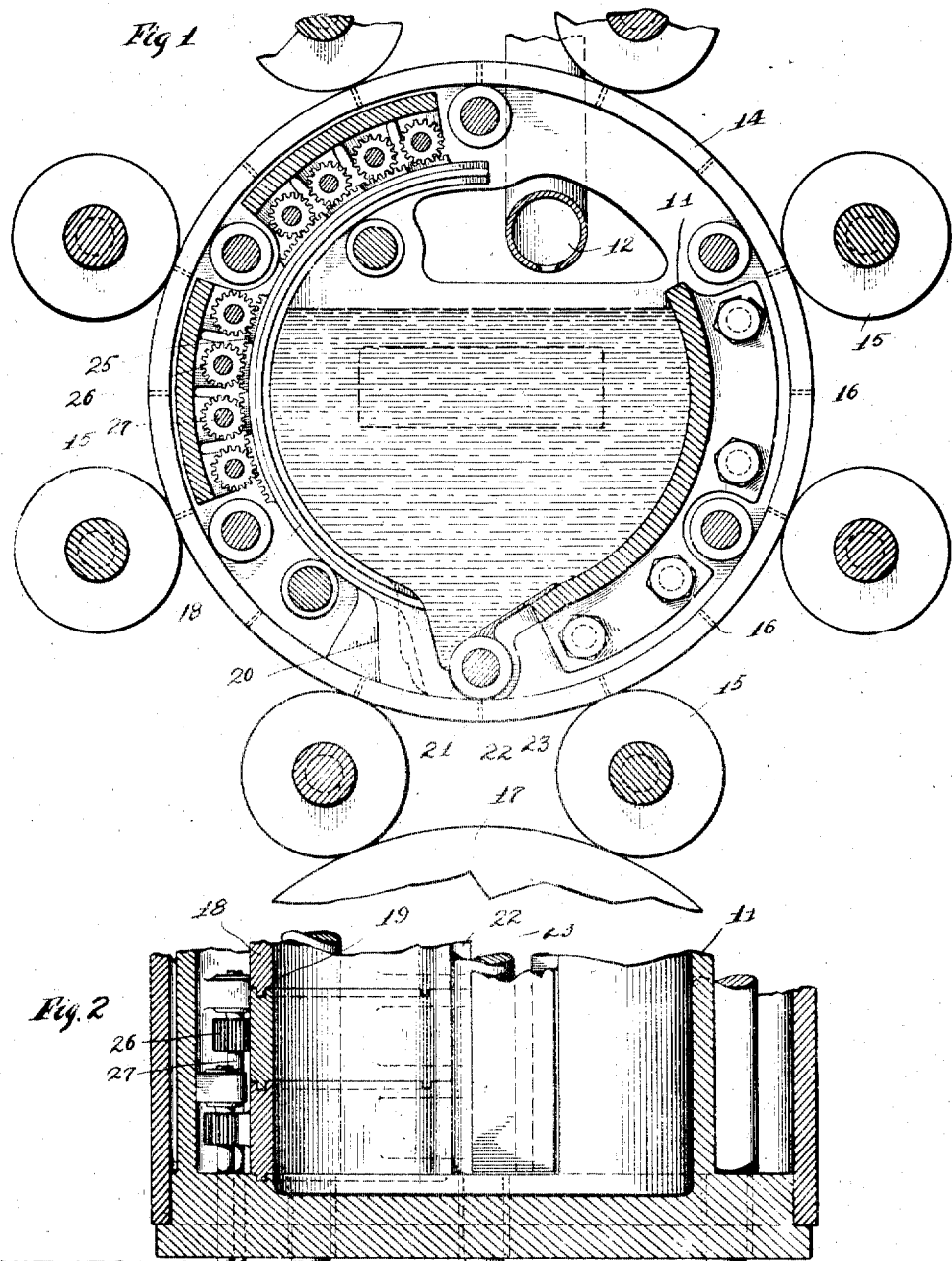
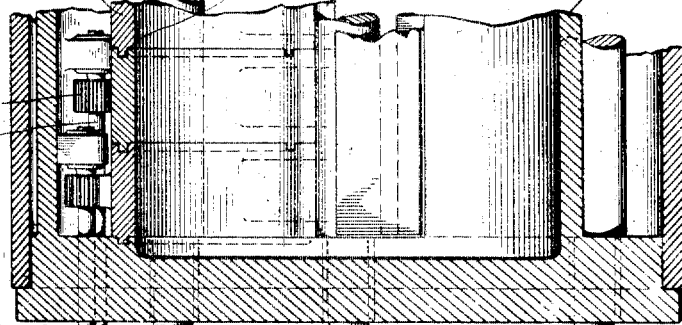
WITNESSES.
INVENTOR
Robert Hoe
Robert Mayrone
ATT'Y

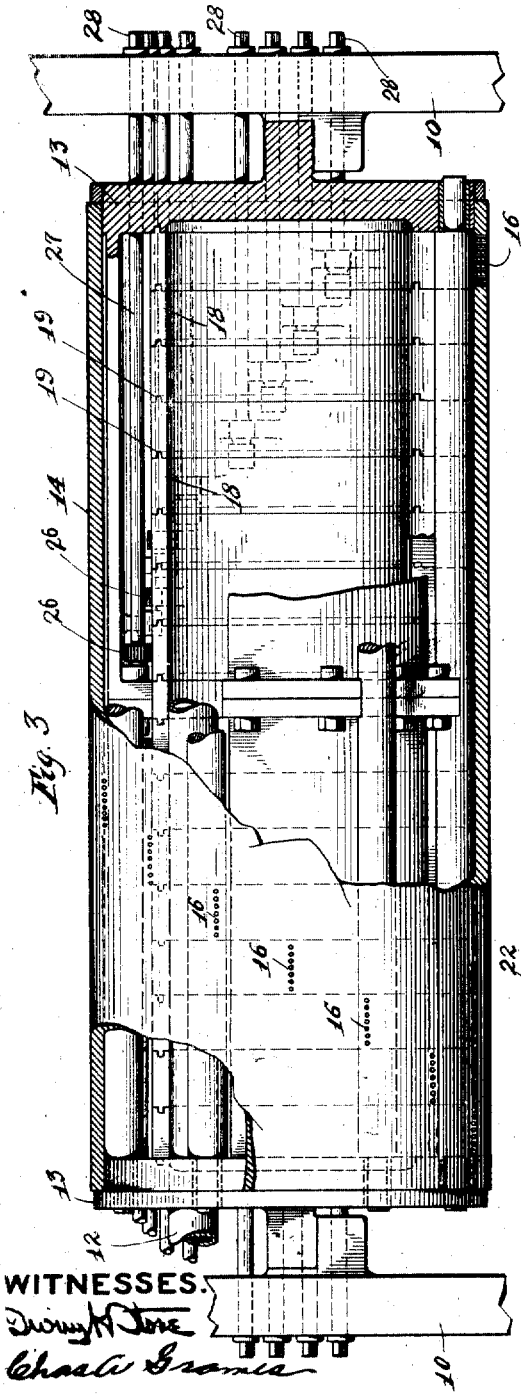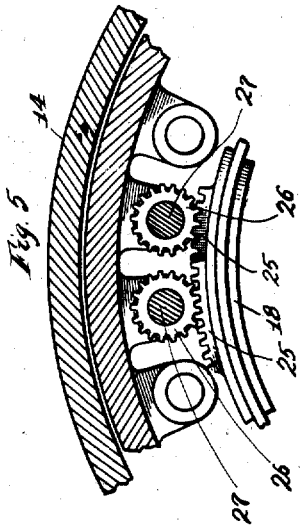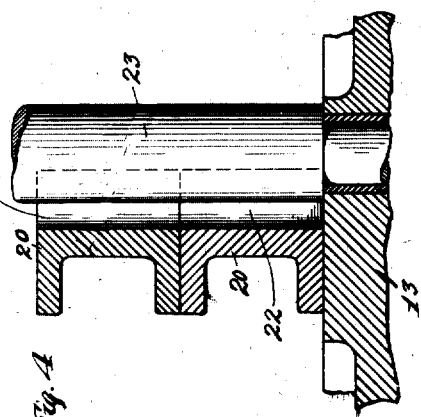

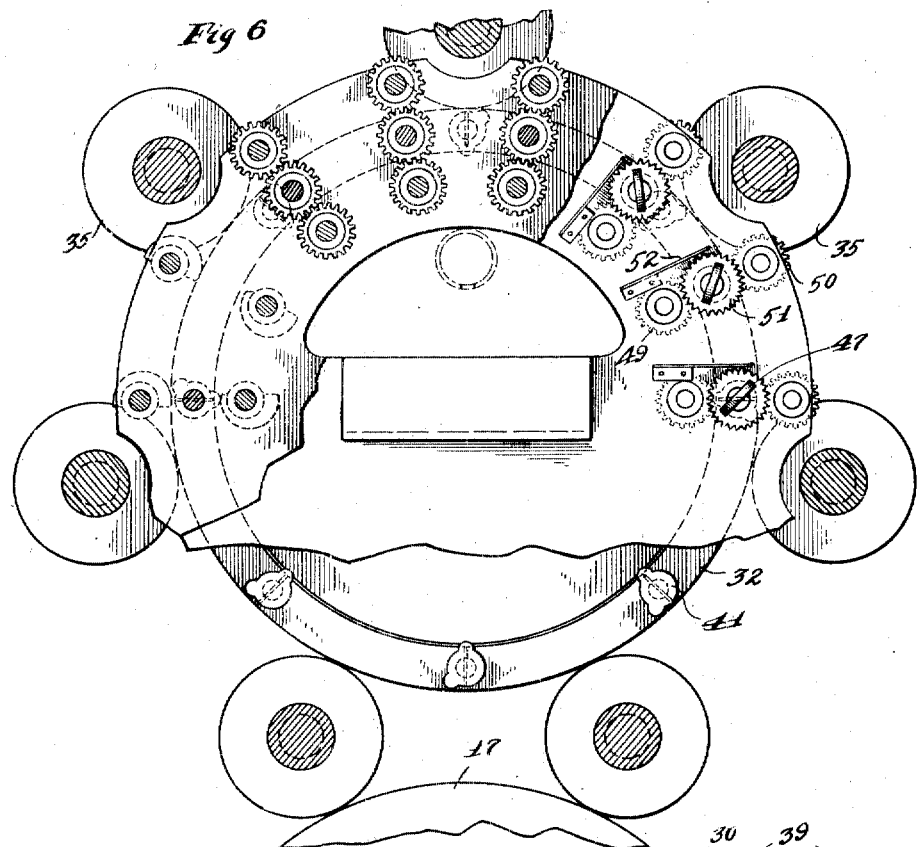
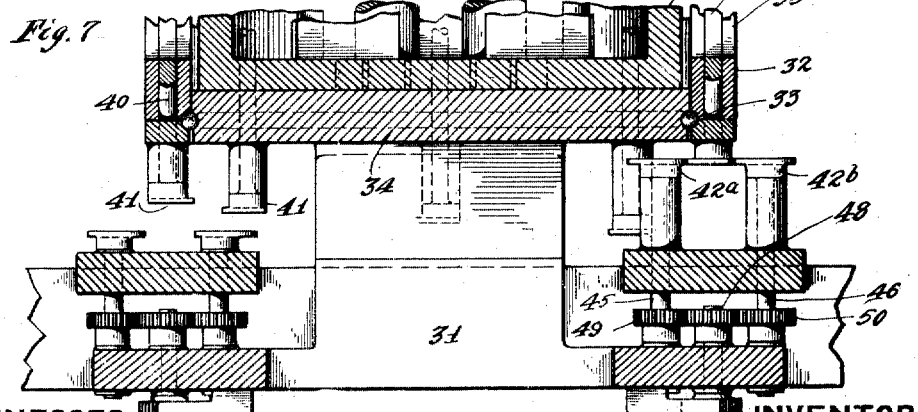

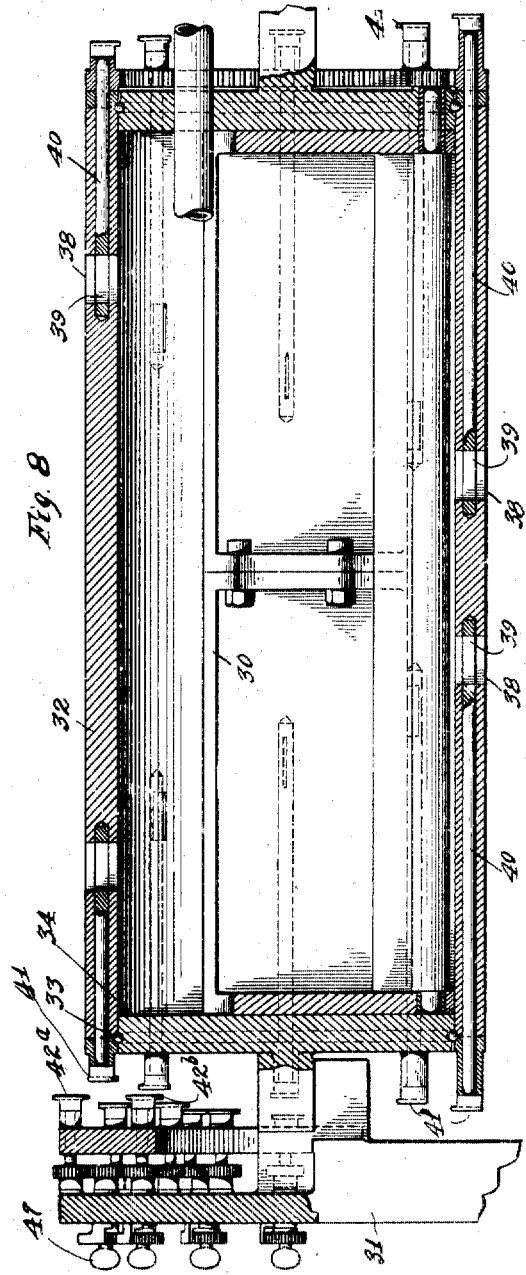

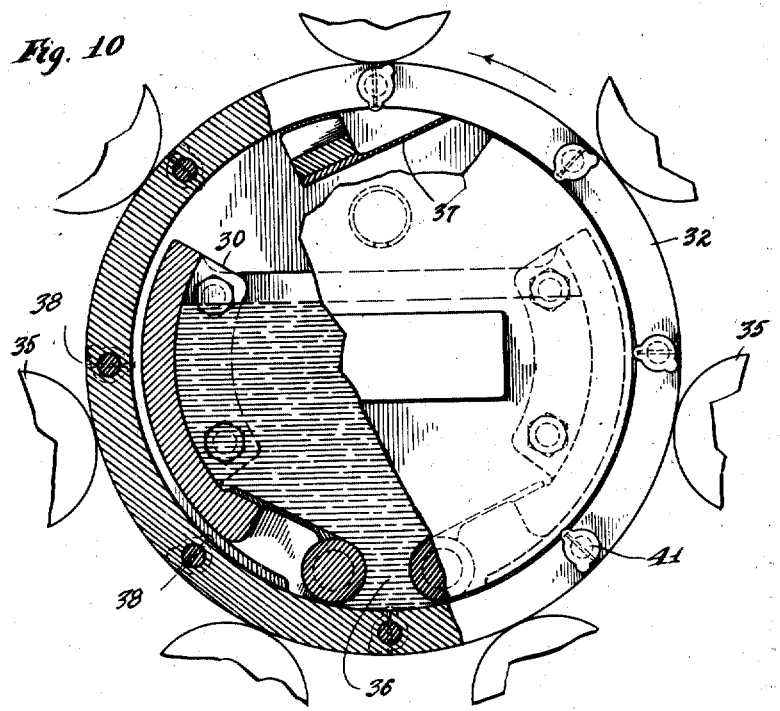
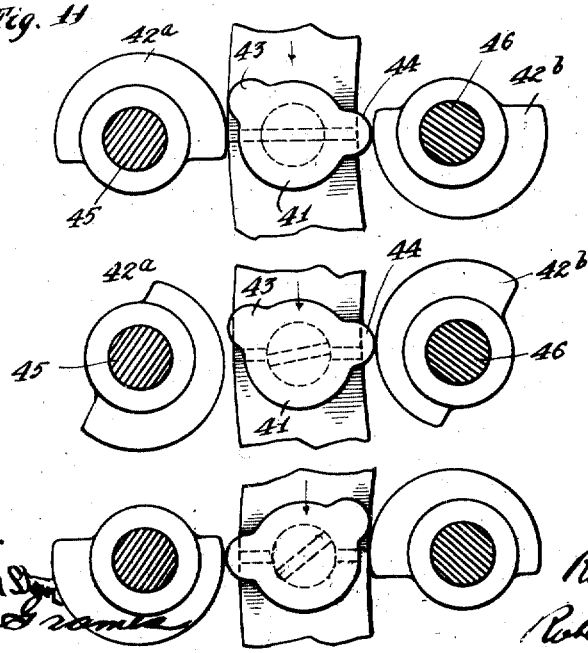

UNITED STATES PATENT OFFICE.

ROBERT HOE, OF BATTLE CREEK, MICHIGAN, ASSIGNOR TO R. HOE AND CO., OF NEW YORK, N. Y., A CORPORATION OF NEW YORK.

INKING MECHANISM.

1,214,787.  Specification of Letters Patent.  Patented Feb. 6, 1917.

Application filed December 16, 1914.  Serial No. 877,566.

*To all whom it may concern:*

Be it known that I, ROBERT HOE, a citizen of the United States, residing at Battle Creek, in the county of Calhoun and State of Michigan, have invented new and useful Improvements in Inking Mechanisms, of which the following is a specification.

This invention relates to inking mechanism for printing presses.

One object of the invention is to provide a mechanism that may supply ink separately for each column of the printing and in which the feed may be independently adjusted for each column so as to secure the desired printing of all portions of the sheet or web.

Another object is to provide a mechanism that will eliminate the feeding of ink through fine apertures or slits which may become clogged by the thickening of the ink or the presence of impurities or coarse particles in the ink; and still other objects will appear in the following description and the appended claims.

Figure 12:
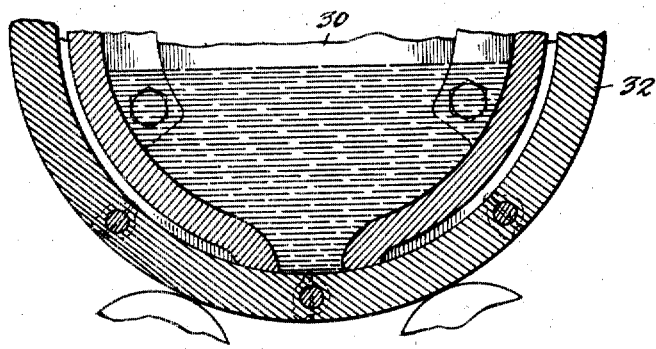
Figure 13:
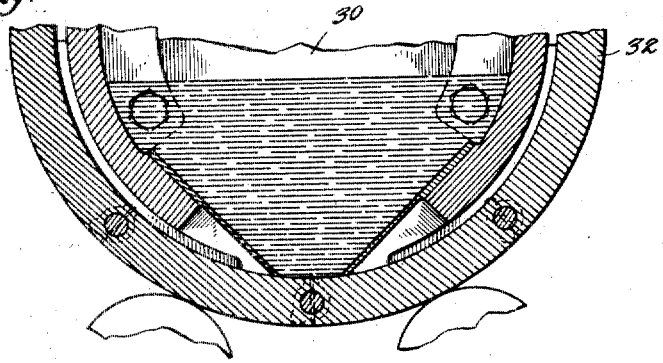
Figure 14:
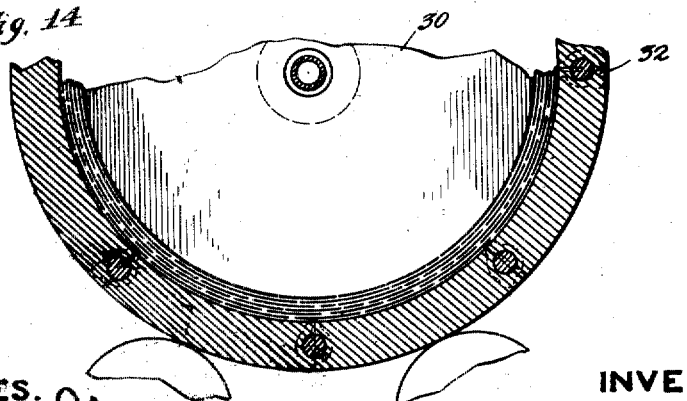

Referring to the drawings: Figure 1 is a sectional end elevation of the improved inking mechanism; Fig. 2 is a sectional plan view of part of the mechanism; Fig. 3 is a side elevation with parts broken away to show construction; Fig. 4 is a sectional plan view of a detail; Fig. 5 is a sectional end elevation of adjusting mechanism; Fig. 6 is an end elevation, partly in section, of a modification; Fig. 7 is a sectional plan view of part of the mechanism shown in Fig. 6; Fig. 8 is a sectional side elevation; Fig. 9 is a developed plan view of the adjusting means; Fig. 10 is an end elevation in section showing the ink container and associated parts; Fig. 11 is a diagrammatic view showing operation of adjusting mechanism; and Figs. 12, 13 and 14 are end sections in elevation of various forms of ink containers.

In some forms of printing presses it is desirable that the inking mechanism be adapted to supply ink separately for each column of the printing and that the mechanism be further equipped with adjusting means so that the supply of ink for each column may be regulated independently of the ink supply for the other columns. Up to the present time, inking mechanism that has secured these results has included means for delivering the ink in the form of a thin film, or in sheets, or in the form or condition of spray. In all such constructions the ink is fed substantially in a continuous stream.

The improved mechanism herein disclosed secures the advantages outlined above and also provides for feeding the ink mechanically and intermittently. One advantage of this intermittent feed is that the presence of impurities or coarse particles in the ink, or the thickening of the ink itself, will not cause the feeding to become imperfect or defective in any column or columns. It is obvious that, given a certain desired rate of feeding, if the ink be supplied intermittently the amount delivered at any one time must be greater than when it is supplied continuously. It is further obvious, as a consequence of this, that any passages through which the ink is to be fed will be considerably larger in cross-sectional area in the case of intermittent feed than in the case of continuous feed, and that they will be less easy to choke up or become inoperative. The same consequence also follows in other forms of feeding mechanism where the ink is transferred by roller contacts and the like. Other advantages are that the intermittent feeding of the ink is more positive and certain; the quality of the ink becomes of less importance so far as the feeding operation is concerned; the independent supply to each column may be more closely regulated, and the supply of ink for each column is more assured.

Figs. 1 to 5 inclusive show a preferred form of construction that will accomplish all of these objects. Upon the frame 10 of the press is mounted an ink container 11 roughly cylindrical in form and supplied with ink through a pipe 12. The container terminates in cylindrical heads 13, 13 which form bearings for a shell 14 surrounding the container. The shell 14 is adapted to rotate about the common axis of the container and shell and is driven by rollers 15, 15 in contact therewith. As shown in Fig. 3, the shell includes a series of feeding devices comprising in the present illustration of the invention staggered apertures 16, 16, each so-called aperture composed of a group of small holes, each group representing a separate column. Ink may be fed through each of these apertures 16 if the shell 14 be rotated. As shown in Fig. 1, any aperture 16 is in communication with the ink container only when the aperture is in the lowermost position it occupies during the rotation of the shell. At this point ink is fed through the aperture to the distributing roll 17. At all other points throughout the rotation of shell 14, the ink supply is cut off. The flow of ink through any aperture 16 is therefore intermittent, and as the interval during which the feeding can take place is relatively very short, the aperture 16 is made correspondingly large. The mechanism further includes adjusting means to regulate the quantity of ink supplied to each column.

As shown in Figs. 1 and 3, the ink container 11 has one of its side walls formed of a series of sectors, 18, 18 mortised together as indicated at 19, 19 to form liquid tight joints. Each sector is the width of a column of the matter to be printed and is in registration with one of the series of apertures 16. Each sector slides between the adjacent sectors, and each is adapted to be moved in a circular path having the same axis as the shell 14. The sectors are provided with respective shoes or scrapers 20, having a lower face 21 in contact with the shell 14 and a second face 22 curved to conform with the periphery of a roller 23 which extends longitudinally along the bottom of the ink container 11. When any sector is positioned so that the face 22 is in contact with the ink roller 23, communication with the ink container is cut off and the related aperture 16 will have its supply of ink cut off. The amount of ink supplied for any column aperture will vary with the space between the face 22 and roller 23.

As best shown in Figs. 1, 2 and 5, each sector is provided with a gear segment 25 which meshes with a pinion 26 carried upon a shaft 27. Each shaft 27 terminates at the side of the machine in a bolthead 28 adapted to be engaged by a wrench. The adjustment of any one of these boltheads will rotate the respective shaft 27, pinion 26, segment 25, and sector 18 and thus determine the amount of ink to be supplied to the particular column related to the bolthead. As indicated in the drawings, the gear segments are staggered with relation to each other so as to permit the circular arrangement of the adjusting shafts 27 shown.

Figs. 6 to 11 inclusive illustrate a modified form of mechanism securing the same results. As shown in Fig. 10, this form includes an ink container 30 attached to the frame 31 of the press and surrounded by a rotary shell 32 having its bearings 33 upon the ends 34 of the container. The shell is rotated by rolls 35, 35. The ink container has an aperture opening 36 along the bottom through which the ink passes into contact with the inner surface of the shell at its lowest point. A scraper 37 is provided to keep the shell free of excess ink. The shell is provided with a series of passages 38 which are equidistant radially with respect to each other, as shown in Fig. 10, but which are staggered in longitudinal relation with each other as shown in Fig. 8, the lateral positions as shown corresponding with the columns of matter to be printed in the manner described with reference to the apertures 16. As in the former embodiment of the invention, this construction provides for an intermittent feeding of ink through the passages 38, the feeding taking place when the aperture is at its lowest point.

The adjusting means to regulate the quantity of ink supplied to each column includes a valve 39 for each of the passages 38. The valve is formed in the end of a stem or shaft 40 carried in the shell and the outer end of the shaft is provided with a camming head 41, best shown in Figs. 8 and 11. A pair of coacting cams 42$^a$ and 42$^b$ are positioned in the path of each camming head 41, the lugs 43, 44 of which are adapted to contact with the cams so that the position of the cams determines the angular movement of the head 41 and shaft 40, as indicated in Fig. 11, this movement operating to adjust the valve 39. As shown in Fig. 8, each of the camming heads 41 projects from the end of the shell a different extent than the others, so that each pair of cams contacts with and controls the angular movement of but one camming head.

The cams 42$^a$ and 42$^b$ are mounted upon shafts 45 and 46 respectively and are rotated in unison from a thumb piece 47 mounted in the frame and joined to a pinion 48 which meshes with pinions 49, 50 attached respectively to shafts 45 and 46. To prevent disturbance of adjustment, the thumb piece 47 may be further equipped with a star wheel 51, as shown in Fig. 6, operating with a spring detent 52 to hold the cams in their adjusted position.

Figs. 12, 13 and 14 illustrate modifications of the ink container showing various forms of reservoirs and arrangements for delivering the ink to the rotary shell.

Changes and variations may be made in the constructions by which the invention is carried into effect. The invention of applicant is broadly the application of intermittent feed or mechanically operated devices in the feeding of ink in separate columns and the control or regulation of the ink supplied to each column as desired, and many various devices may be employed to carry out this invention. The invention is not therefore to be confined to the particular constructions herein shown and described.

It will be noticed that in this mechanism the ink is fed in a solid mass, or under liquid pressure, and that there is no atomizing of the ink by air before the feeding is complete. By this apparatus the ink comes in contact with a minimum amount of air, and the evaporation of the volatile constituents of the ink is reduced to the smallest amount.

I claim:

1. In an inking mechanism for printing presses, an ink container, mechanism for intermittently feeding the ink by liquid pressure through passages from the container in different columns or sections corresponding with the matter to be printed, the said mechanism being normally in motion during the actuation of the press and controlling by said motion the feeding of the ink.

2. In an inking mechanism for printing presses, an ink container, a series of feeding devices for intermittently supplying ink under liquid pressure in different columns or sections corresponding with the matter to be printed, the said devices being normally in motion during the actuation of the press.

3. In an inking mechanism for printing presses, an ink container and a series of intermittently operative feeding devices adapted respectively to supply ink from the container by liquid pressure in different columns or sections corresponding with the matter to be printed.

4. In an inking mechanism for printing presses, an ink container, a series of intermittently operative feeding devices for supplying ink from the container under liquid pressure in different columns or sections, and adjusting means for said devices whereby the supply of ink for any column may be regulated independently of the regulation for the other columns.

5. In an inking mechanism for printing presses, an ink container, a distributing roll, a series of passages between the container and the roll through which the ink may be fed under liquid pressure intermittently to the roll, and mechanism normally in motion during the actuation of the press and controlling the intermittent feeding of ink through the respective passages.

6. In an inking mechanism for printing presses, an ink container having separate ink feeding openings for different columns or sections of the matter to be printed, intermittently operative mechanism normally in motion during the actuation of the press and controlling the feed of ink under liquid pressure through the openings, and adjusting means adapted to regulate the quantity of ink supplied for the different columns independently of one another.

7. In an inking mechanism for printing presses, an ink container, a distributing roll, mechanically operated ink feeding mechanism for feeding the ink intermittently under liquid pressure through passages to the roll for different columns or sections of the matter to be printed, the said mechanism including means whereby ink is supplied from the container to the roll for the different columns or sections independently of each other.

8. In an inking mechanism for printing presses, an ink container, a distributing roll, mechanically operated ink feeding mechanism for feeding the ink intermittently under liquid pressure through passages to the roll for different columns or sections of the matter to be printed, the said mechanism including independently adjustable means for the said mechanism whereby the ink supplied for a column may be individually regulated.

9. In an inking mechanism for printing presses, an ink container, a distributing roll, and a series of feeding devices operating mechanically to feed the ink under liquid pressure separately for different columns or sections of the matter to be printed, whereby ink is supplied from the container to the roll for the different columns or sections independently of each other.

10. In an inking mechanism for printing presses, an ink container, a distributing roll, a series of feeding devices operating mechanically to feed the ink under liquid pressure separately for different columns or sections of the matter to be printed, whereby ink is supplied for the different columns or sections independently of each other, and adjustable means for each of said devices whereby the ink supplied for the respective columns may be individually regulated.

11. In an inking mechanism for printing presses, an ink container, distributing devices, and mechanism for feeding the ink intermittently from the container under pressure to the distributing devices in different columns or sections corresponding with the columns or sections of the matter to be printed.

12. In an inking mechanism for printing presses, an ink container, distributing devices, and mechanism for feeding the ink intermittently from the container under pressure to the distributing devices in different columns or sections corresponding with the columns or sections of the matter to be printed, the devices for operating the feeding mechanism being normally in motion during the actuation of the press.

13. In an inking mechanism for printing presses, an ink container, distributing devices, and mechanism for feeding the ink intermittently from the container under pressure, and a series of passages through which the ink is fed to the distributing devices, one for each column or section of the matter to be printed.

14. In an inking mechanism for printing presses, an ink container, distributing devices, and mechanism for feeding the ink intermittently from the container under pressure, and a series of passages through which the ink is fed to the distributing devices, one for each column or section of the matter to be printed, the devices for operating the feeding mechanism being normally in motion during the actuation of the press.

15. In a printing press, inking mechanism including devices for feeding intermittently a definite quantity of ink for each column or section of the matter to be printed separately from the ink for the other columns or sections.

16. In a printing press, inking mechanism including devices for feeding intermittently a definite quantity of ink for each column or section of the matter to be printed separately from the ink for the other columns or sections, and means for regulating the quantity of ink supplied for each column or section independently of the other columns or sections.

17. In a printing press, inking mechanism including ink distributing devices and devices for feeding intermittently to the distributing devices a definite quantity of ink for each column or section of the matter to be printed separately from the ink for the other columns or sections.

18. In a printing press, inking mechanism including ink distributing devices and devices for feeding intermittently to the distributing devices a definite quantity of ink for each column or section of the matter to be printed separately from the ink for the other columns or sections, and means for regulating the quantity of ink supplied for each column or section independently of the other columns or sections.

ROBERT HOE.

Witnesses:
 HARRY K. STOWE,
 CHAS. A. GRAMES.